United States Patent
Zimmermann

(10) Patent No.: US 7,041,404 B2
(45) Date of Patent: May 9, 2006

(54) PASSIVE CONTROL OF FUEL CONCENTRATION IN A LIQUID FEED FUEL CELL

(75) Inventor: Joerg Zimmermann, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 476 days.

(21) Appl. No.: 10/608,355

(22) Filed: Jun. 27, 2003

(65) Prior Publication Data

US 2004/0058222 A1 Mar. 25, 2004

Related U.S. Application Data

(60) Provisional application No. 60/392,729, filed on Jun. 28, 2002.

(51) Int. Cl.
*H01M 8/04* (2006.01)

(52) U.S. Cl. .................... 429/13; 429/24; 429/34; 429/38

(58) Field of Classification Search ............ 429/34
See application file for complete search history.

(56) References Cited

U.S. PATENT DOCUMENTS

| 6,306,285 B1 | 10/2001 | Narayanan et al. ......... 205/787 |
| 6,630,266 B1 * | 10/2003 | Hockaday et al. ............ 429/34 |
| 2002/0076589 A1 | 6/2002 | Bostaph et al. ............... 429/22 |

FOREIGN PATENT DOCUMENTS

| WO | WO 01/35478 | 5/2001 |
| WO | WO 02/49125 | 6/2002 |

* cited by examiner

*Primary Examiner*—Michael Barr
*Assistant Examiner*—Tony Chuo
(74) *Attorney, Agent, or Firm*—Seed IP Law Group PLLC

(57) ABSTRACT

In a liquid feed fuel cell system, substantially pure fuel needs to be added to a dilute mixture of fuel in water so as to maintain the fuel concentration at an appropriate level for use with the fuel cell system. Under passive control of the fuel concentration, a first equilibrium concentration is established between the substantially pure fuel and a fuel transfer medium. A second equilibrium concentration is then established between the fuel transfer medium and the dilute mixture for use with the fuel cell system. The system is "passive" as it does not rely on the measurement of the fuel concentration and direct injection of fuel. The fuel transfer medium can be solid, liquid or gas.

23 Claims, 3 Drawing Sheets

PASSIVE CONTROL OF FUEL CONCENTRATION IN A LIQUID FEED FUEL CELL

CROSS-REFERENCE TO RELATED APPLICATION(S)

This application is related to and claims priority benefits from U.S. Provisional Patent Application Ser. No. 60/392,729, filed on Jun. 28, 2002, entitled "Passive Control of Fuel Concentration in a Liquid Feed Fuel Cell". The '729 provisional application is hereby incorporated by reference herein in its entirety.

FIELD OF THE INVENTION

The present invention relates to the control of fuel concentration in a liquid feed fuel cell. More particularly, the present invention relates to a method and apparatus for passively controlling the concentration of fuel in a liquid feed fuel cell system.

BACKGROUND OF THE INVENTION

In general, electrochemical fuel cells convert reactants, namely fuel and oxidants, to generate electric power and reaction products. Electrochemical fuel cells employ an electrolyte disposed between two electrodes, namely a cathode and an anode. A solid polymer fuel cell is a specific type of fuel cell that employs a membrane electrode assembly ("MEA"), which comprises a solid polymer electrolyte or ion-exchange membrane disposed between the two electrode layers. An electrocatalyst is needed to induce the desired electrochemical reactions at the electrodes. The electrocatalyst is typically incorporated at the electrode/electrolyte interfaces. Flow field plates for directing the reactants across one surface of each electrode substrate are generally disposed on each side of the MEA. Solid polymer fuel cells typically operate in a range from about 40° C. to about 150° C.

A broad range of reactants has been contemplated for use in solid polymer fuel cells and such reactants can be delivered in gaseous or liquid streams. The oxidant may, for example, be substantially pure oxygen or a dilute oxygen stream such as air. The fuel stream may, for example, be substantially pure hydrogen gas, a gaseous hydrogen-containing reformate stream derived from a suitable feedstock, or a suitable gaseous or liquid organic fuel mixture. An advantage of liquid feedstocks and fuels, such as methanol, particularly in non-stationary applications, is that they are relatively easy to store and handle. Further, fuel mixtures that react directly at the anode in a direct liquid feed fuel cell avoid the use of a reformer in the fuel cell system.

A direct liquid feed fuel cell is a type of solid polymer fuel cell that operates using at least one liquid reactant stream. Most typically, direct liquid feed fuel cells operate directly on an organic liquid fuel stream typically supplied as a fuel/water vapor or as an aqueous fuel solution. Typically, methanol is used as the fuel in a direct liquid feed fuel cell though other organic fuels can be used such as, for example, ethanol or dimethyl ether. When methanol is used, the direct liquid feed fuel cell is often referred to as a direct methanol fuel cell (DMFC). The reaction at the anode involves the direct oxidation of methanol and water. There is often a problem in DMFCs with crossover of methanol fuel from the anode to the cathode side through the membrane electrolyte. The methanol that crosses over typically reacts with oxidant at the cathode and cannot be recovered, resulting in significant fuel inefficiency and deterioration in fuel cell performance. To reduce crossover, dilute solutions of methanol, for example, 5% methanol in water, are typically used as fuel streams. The fuel streams in DMFCs are usually recirculated in order to remove carbon dioxide, a by-product of the reaction at the anode, and to re-use the diluent and unreacted fuel in the depleted fuel stream exiting the DMFC. Methanol is added to the circulating fuel stream before it re-enters the fuel cell in order to compensate for the amount consumed, thereby providing a fresh mixture at the desired methanol concentration. Since the amount of methanol consumed is variable (depending on the load, crossover, and other operating parameters), the methanol concentration in the circulating fuel stream is usually measured continuously with a suitable sensor, and fresh methanol is admitted by a fuel injector in accordance with the signal from the sensor.

Relevant factors in developing a system for controlling the concentration of methanol in the system include cost, size, simplicity, reliability, longevity, concentration range and dynamic response.

SUMMARY OF THE INVENTION

A liquid feed fuel cell system includes a fuel delivery subsystem in communication with a fuel cell stack. The fuel delivery subsystem comprises:

(a) a first fuel reservoir containing substantially pure fuel;
(b) a second fuel reservoir containing fuel and water, the second fuel reservoir being in communication with the fuel cell stack for delivery of the fuel and water;
(c) a fuel transfer medium coupled with both the first fuel reservoir and the second fuel reservoir such that fuel is able to migrate between the first fuel reservoir and the fuel transfer medium and between the fuel transfer medium and the second fuel reservoir.

The substantially pure fuel in the first fuel reservoir consists essentially of the pure fuel and it is understood that various impurities may be present in the fuel.

Fuel migrates from the first fuel reservoir to the fuel transfer medium to maintain a first equilibrium concentration of fuel in the fuel transfer medium. Fuel then migrates from the fuel transfer medium to the second fuel reservoir to maintain a second equilibrium concentration of fuel in the second fuel second fuel reservoir. The second equilibrium concentration of fuel is suitable for delivery to the liquid feed fuel cell system. Preferably back-migration of water from the second fuel reservoir to the first fuel reservoir is reduced or eliminated. The liquid transfer medium can be a solid, liquid or gas.

In an embodiment, the solid transfer medium is a membrane interposed between the two fuel reservoirs. The membrane preferably swells when in contact with the substantially pure fuel to thus form a first equilibrium concentration of fuel within the membrane.

In another embodiment, the liquid transfer medium is a liquid. A first membrane can separate the first fuel reservoir and the fuel transfer medium and a second membrane can similarly separate the fuel transfer medium and the second fuel reservoir. Both membranes should be permeable to the fuel but impermeable to the fuel transfer medium.

In a third embodiment, the fuel transfer medium is a gas. Preferably, the gas is an inert gas such as, for example, nitrogen. In such an embodiment, the fuel delivery subsystem can further comprise:

(d) a first coupling between a first header space above the fuel in the first fuel reservoir and the fuel and water mixture in the second fuel reservoir;

(e) a second coupling between a second header space above the fuel and water mixture in the second fuel reservoir and the substantially pure fuel in the first fuel reservoir;

(f) a gas pump for circulating the fuel transfer medium from the first fuel reservoir through the first coupling to the second fuel reservoir and therefrom through the second coupling back to the first fuel reservoir;

(g) a first temperature control for maintaining the temperature of the first fuel reservoir at a first temperature; and (h) a second temperature control for maintaining the temperature of the second fuel reservoir at a second temperature.

By maintaining a temperature differential between the two reservoirs, the first and second equilibrium concentrations can be adjusted. Furthermore, when the first temperature is below ambient temperature, preferably between −20° C. and 20° C. and the second temperature is above ambient temperature, preferably between 20° C. and 120° C., back migration of water from the second fuel reservoir to the first fuel reservoir can be reduced or minimized due to condensation of the water.

In a embodiment, the fuel used is methanol and the liquid feed fuel cell system is, accordingly, a direct methanol fuel cell system.

DETAILED DESCRIPTION OF PREFERRED EMBODIMENT(S)

Figure 1:
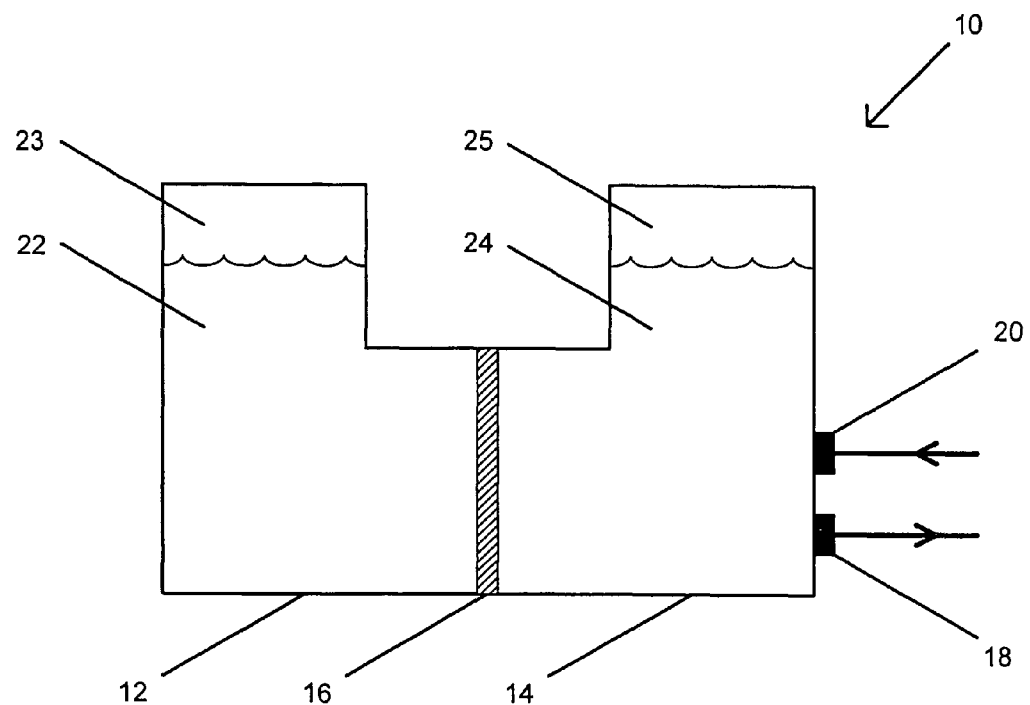
FIG. 1 is a fuel delivery subsystem for an electrochemical fuel cell system having a solid fuel transfer medium.

FIG. 1 is a fuel delivery subsystem 10 for a liquid feed electrochemical fuel cell system. For the purposes of this description, the fuel used will be methanol and the liquid feed fuel cell system will accordingly be a DMFC system. For ease of nomenclature, "fuel mixture" will refer to the dilute mixture of methanol in water used with the DMFC system.

Methanol reservoir 12 is separated from fuel reservoir 14 by membrane 16. Methanol reservoir 12 contains substantially pure methanol 22 whereas fuel reservoir 14 contains fuel mixture 24. Above methanol 22 is a header space 23 and above fuel mixture 24 is a header space 25. Fuel cell stack port 18 connects fuel reservoir 14 to the fuel cell stack (not shown). Fuel exhaust port 20 connects the fuel exhaust of the fuel cell stack (not shown) with fuel reservoir 14. As methanol is consumed, fuel mixture 24 would consequently become increasingly diluted without the continued addition of substantially pure methanol. This is avoided by the use of a fuel transfer medium that allows the passive control of methanol concentration. In the fuel delivery subsystem illustrated in FIG. 1, the fuel transfer medium is membrane 16.

Membrane 16, selected so as to have a specific absorption to methanol, swells upon contact with methanol 22. The amount of swelling of membrane 16 establishes a first equilibrium concentration of methanol in membrane 16. Contact between the swollen membrane 16 and fuel mixture 24 in fuel reservoir 14, causes methanol to migrate from the swollen membrane 16 to fuel reservoir 14 to establish a second equilibrium concentration of methanol in water in fuel reservoir 14. Preferably membrane 16 is impermeable to water to thereby prevent the back migration of water from fuel reservoir 14 to methanol reservoir 12.

The second equilibrium concentration will be a function of the first equilibrium concentration that is dependent on the type of material used for membrane 16. Assuming the membrane is suitably chosen, fuel delivery subsystem 10 equilibrates to provide a concentration of methanol in fuel reservoir 14 suitable for use with the fuel cell stack. It is expected that a cross-linked polymer that is insoluble in both water and methanol yet partially permeable to methanol would be suitable for use as membrane 16. Further, it is expected that suitable acetals and polyesters can be used for membrane 16.

Figure 2:
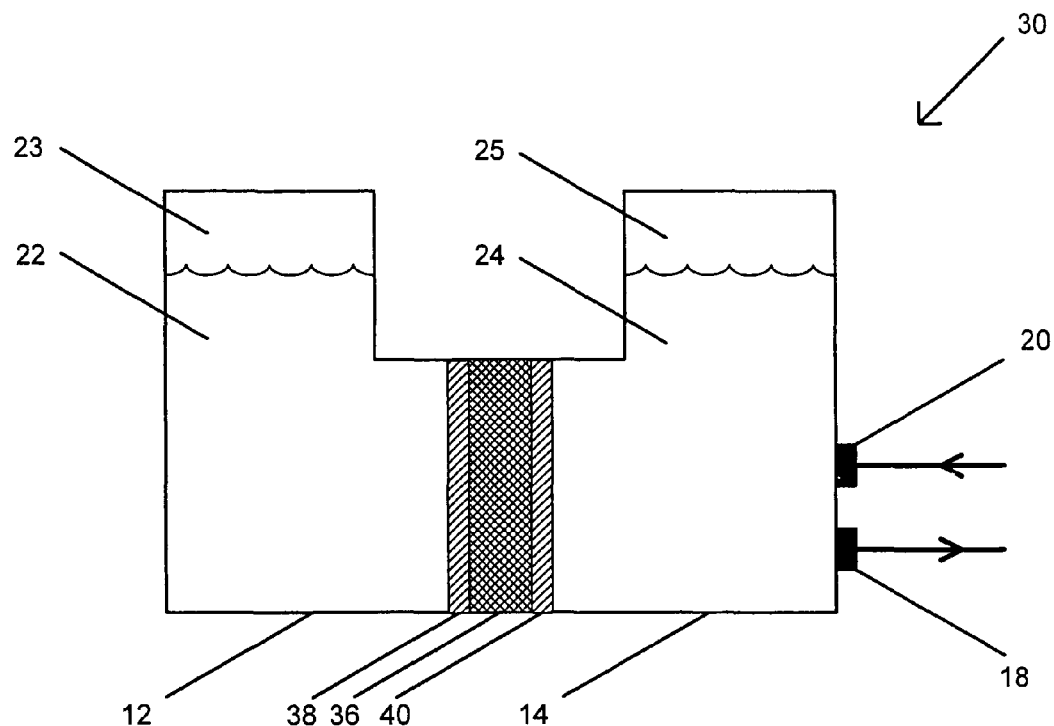
FIG. 2 is a fuel delivery subsystem for an electrochemical fuel cell system having a liquid fuel transfer medium.

FIG. 2 is a fuel delivery subsystem 30 for a fuel cell system similar to the fuel delivery subsystem in FIG. 1 except that the fuel transfer medium is a liquid as opposed to a solid. Similar numerical references refer to similar structures in each figure.

In FIG. 2, liquid media 36 is interposed between methanol reservoir 12 and fuel reservoir 14. Membranes 38 and 40 separate methanol 22 and fuel mixture 24 respectively from liquid media 36.

Membranes 38 and 40 in FIG. 2 perform a different function than membrane 16 in FIG. 1. In FIG. 1, membrane 16 acts as the fluid transfer medium whereas in FIG. 2, membranes 38 and 40 contain and separate the fluid transfer medium, namely liquid media 36. As such, it would be expected that different membranes with different properties for the membranes would be sought for the different applications. For example, membrane 16 in the embodiment illustrated by FIG. 1 would be expected to have a low methanol permeablility whereas membranes 38 and 40 should have a relatively high methanol permeability. While membranes 38 and 40 should be substantially permeable to methanol, the membranes should also be impermeable to liquid media 36.

To act as a fluid transfer medium, methanol should be soluble within liquid media 36. Back migration of water from migrating from fuel reservoir 14 to fuel reservoir 12, can be prevented if membranes 38 and 40 are impermeable to water. Alternatively, back migration can be prevented if water is insoluble in liquid media 36.

Thus, the migration of methanol from methanol reservoir 12 through membrane 38 establishes a first equilibrium concentration of methanol in liquid media 36. The methanol then migrates from liquid media 36 to fuel reservoir 14 to a second equilibrium concentration of methanol in water. The first equilibrium concentration is related to the solubility of fuel in liquid media 36 and the second equilibrium concentration is related to the first equilibrium concentration. Proper selection of liquid media with an appropriate solubility of methanol provides for a second equilibrium concentration suitable for use with the DMFC system.

Figure 3:
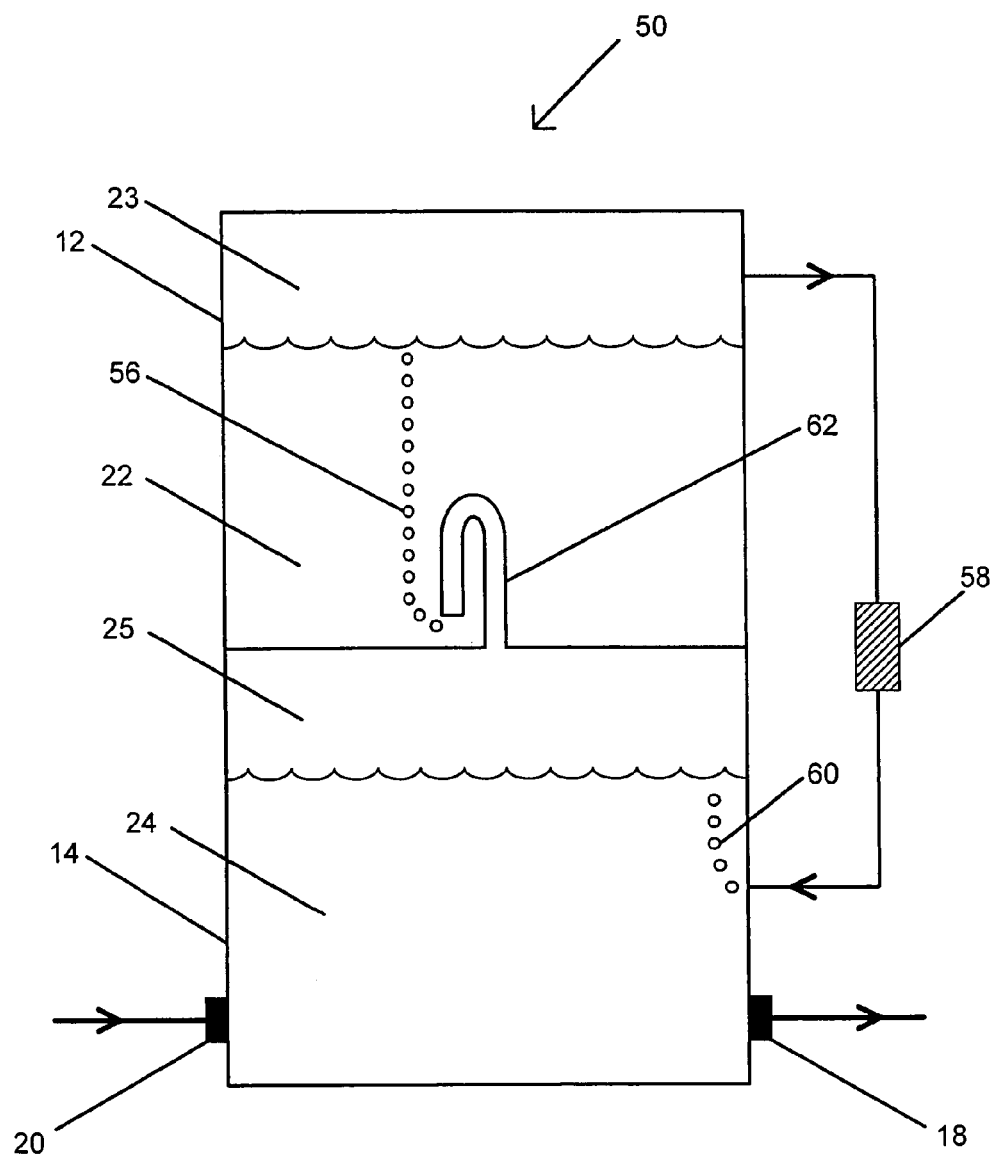
FIG. 3 is a fuel delivery subsystem for an electrochemical fuel cell system having a gaseous fuel transfer medium.

FIG. 3 illustrates a more complicated fuel delivery subsystem 50 wherein the fuel transfer medium is a gas. In such a system, unlike the systems described in FIGS. 1 and 2, header space 23 above methanol 22 and header space 25 above fuel mixture 24 can be useful in the passive control of methanol concentration in fuel reservoir 14.

Pump 58 circulates an inert gas such as, for example, nitrogen, from header space 23 to fuel mixture 24. The inert gas in header space 23 contains a first equilibrium concentration of methanol depending on the temperature of methanol reservoir 12 and the pressure of the system. As the gas is circulated to fuel reservoir 14, bubbles 60 form in fuel mixture 24. Methanol in the gas at a first equilibrium concentration then migrates into fuel mixture 24 to a second equilibrium concentration. Thus the methanol delivery subsystem of FIG. 3 passively maintains the concentration of methanol in fuel reservoir 14 in a similar manner as for solid or liquid based systems.

Coupling 62 allows the gas to continue circulating from fuel reservoir 14 back to methanol reservoir 12 thereby equilibrating the pressure and maintaining a closed system. Coupling 62 should be coupled so as to provide for gas to circulate with little or no direct leaking of methanol or fuel mixture between the two reservoirs.

By configuring coupling 62 between header space 25 and methanol 22, so as to allow the gas to come into direct contact with the methanol by forming bubbles 56, the gas quickly comes to the first equilibrium concentration.

During operation of the fuel cell stack, the pressure and the temperature of fuel reservoir 14 can be kept stable such that the first equilibrium concentration can be controlled by the temperature of methanol reservoir 12.

The amount of water vapor transferred from fuel reservoir 14 to methanol reservoir 12 can be reduced or minimized by controlling the relative temperatures of the two reservoirs. For example, if fuel reservoir 14 is above ambient temperature, preferably between 20° C. and 120° C., and methanol reservoir 12 is below ambient temperature, preferably between −20° C. and 20° C., water vapor will condense at coupling 62 and fall back into fuel reservoir 14. To reduce or minimize the transfer of water, the gas should be brought to the temperature of fuel reservoir 12 before exiting fuel reservoir 14. The shape and orientation of coupling 62 can be easily adjusted to improve condensation of water vapor. As the gas would not be supersaturated with methanol, the methanol would not similarly condense.

The embodiments as described in FIGS. 1 and 2 passively control the concentration of fuel as there is no independent measurement of fuel concentration nor direct injection of fuel in response to such a measurement. Thus the systems are simpler, cheaper and more reliable than conventional systems. Comparatively, the embodiment as described in FIG. 3 is considerably more complicated such that these same advantages are thereby reduced. Nevertheless, the embodiment as described in FIG. 3 is still considered to be a "passive" system since it relies on the properties of a fuel transfer medium, in this case, an inert gas to indirectly control the concentration of fuel without the independent measurement of fuel concentration nor direct injection of fuel.

While particular steps, elements, embodiments and applications of the present invention have been shown and described, it will be understood, of course, that the invention is not limited thereto since modifications can be made by persons skilled in the art, particularly in light of the foregoing teachings. It is therefore contemplated by the appended claims to cover such modifications as incorporate those steps or elements that come within the scope of the invention.

What is claimed is:

1. A fuel delivery subsystem for a liquid feed fuel cell system having a fuel cell stack, the fuel delivery subsystem comprising:

(a) a first fuel reservoir containing substantially pure fuel;
   (b) a second fuel reservoir containing fuel and water, the second fuel reservoir being in communication with the fuel cell stack for delivery of the fuel and water; and
   (c) a fuel transfer medium coupled with both the first fuel reservoir and the second fuel reservoir such that fuel is able to migrate between the first fuel reservoir and the fuel transfer medium and between the fuel transfer medium and the second fuel reservoir;

whereby fuel migrates from the first fuel reservoir to the fuel transfer medium to maintain a first equilibrium concentration of fuel in the fuel transfer medium and whereby fuel migrates from the fuel transfer medium to the second fuel reservoir to maintain a second equilibrium concentration of fuel in the second fuel reservoir.

2. The fuel delivery subsystem of claim 1 wherein the fuel transfer medium is one of a gas, a liquid and a solid.

3. The fuel delivery subsystem of claim 2 wherein the fuel transfer medium is a solid.

4. The fuel delivery subsystem of claim 3 wherein the solid is a membrane separating the first fuel reservoir and the second fuel reservoir.

5. The fuel delivery subsystem of claim 4 wherein the membrane is a cross-linked polymer.

6. The fuel delivery subsystem of claim 4 wherein the membrane is water impermeable.

7. The fuel delivery subsystem of claim 2 wherein the fuel transfer medium is a liquid.

8. The fuel delivery subsystem of claim 7 wherein water is insoluble in the fuel transfer medium.

9. The fuel delivery subsystem of claim 7 further comprising a first membrane separating the first fuel reservoir and the fuel transfer medium and a second membrane separating the fuel transfer medium and the second fuel reservoir, both membranes being permeable to the fuel and impermeable to the fuel transfer medium.

10. The fuel delivery subsystem of claim 9 wherein at least one of the membranes is impermeable to water.

11. The fuel delivery subsystem of claim 2 wherein the fuel transfer medium is a gas.

12. The fuel delivery subsystem of claim 11 wherein the gas is inert.

13. The fuel delivery subsystem of claim 12 wherein the inert gas is nitrogen.

14. The fuel delivery subsystem of claim 11 wherein the first fuel reservoir has a first header space above the fuel and the second fuel reservoir has a second header space above the mixture of fuel and water, the fuel delivery subsystem further comprising:

(d) a first coupling between the first header space and the fuel and water in the second fuel reservoir;
   (e) a second coupling between the second header space and the fuel in the first fuel reservoir;
   (f) a gas pump for circulating the fuel transfer medium from the first fuel reservoir through the first coupling to the second fuel reservoir and therefrom through the second coupling back to the first fuel reservoir;
   (g) a first temperature control for maintaining the temperature of the first fuel reservoir at a first temperature; and
   (h) a second temperature control for maintaining the temperature of the second fuel reservoir at a second temperature greater than the first temperature.

15. The fuel delivery subsystem of claim 14 wherein the second temperature is above ambient temperature.

16. The fuel delivery subsystem of claim 15 wherein the second temperature is between 20° C. and 120° C.

17. The fuel delivery subsystem of claim 14 wherein the first temperature is below ambient temperature.

18. The fuel delivery subsystem of claim 17 wherein the first temperature is between −20° C. and 20° C.

19. The fuel delivery subsystem of claim 1 wherein the fuel is methanol.

20. A liquid feed fuel cell system comprising a fuel delivery subsystem of claim 1.

21. The liquid feed fuel cell system of claim 20 wherein the liquid feed fuel cell system is a direct methanol fuel cell system.

22. A method of operating a liquid feed fuel cell system comprising:
 (a) providing a fuel cell stack;
 (b) providing a first fuel reservoir containing substantially pure fuel;
 (c) providing a second fuel reservoir containing fuel and water, the second fuel reservoir being in communication with the fuel cell stack;
 (d) providing a fuel transfer medium coupled with both the first fuel reservoir and the second fuel reservoir such that fuel is able to migrate between the first fuel reservoir and the fuel transfer medium and between the fuel transfer medium and the second fuel reservoir;
 (e) delivering the fuel and water from the second fuel reservoir to the fuel cell stack; and
 (f) operating the fuel cell stack.

23. The method of claim 22 wherein the fuel transfer medium is one of a gas, a liquid and a solid.

* * * * *